Patented Nov. 2, 1948

2,452,975

UNITED STATES PATENT OFFICE 2,452,975

PRODUCTION OF ORGANIC FLUORINE COMPOUNDS

William Basil Whalley, Liverpool, England, assignor to Imperial Chemical Industries Limited, a corporation of Great Britain No Drawing. Application January 22, 1947, Serial No. 723,676

9 Claims. (Cl. 260—653)

This invention relates to the production of fluoro derivatives of saturated aliphatic hydrocarbons and more particularly to the production of monofluoro derivatives of such compounds.

The method of fluorinating aliphatic halohydrocarbons with hydrogen fluoride in the presence of a catalyst consisting of an antimony halide such as antimony pentachloride or an antimony fluorochloride is well known. Other catalysts have also been used for these reactions, for example in U. S. Patents Nos. 2,005,707, and 2,005,711 the use of metallic halides, in particular heavy metal halides, for this purpose is described.

Difficulties have been experienced in attempting to prepare the monofluoro derivatives of some aliphatic halohydrocarbons, containing more than one atom of halogen other than fluorine, attached to the same terminal carbon atom by fluorination with hydrogen fluoride in the presence of the usual antimony halide catalysts, the tendency being to produce the difluoro derivatives almost exclusively by this method, together with varying quantities of coke.

According to the present invention a process for the production of a monofluoro derivative of a saturated halohydrocarbon comprises reacting a saturated aliphatic halogenated hydrocarbon containing at least two atoms of halogen other than fluorine attached to the same terminal carbon atom at a temperature of at least 30° C. and at elevated pressure with anhydrous hydrogen fluoride in the presence of stannic chloride as catalyst.

Stannic chloride appears to have a milder action as a fluorination catalyst than that of antimony pentachloride and the other common antimony halide catalysts. Thus, when stannic chloride is used as the catalyst, for example in the fluorination of ethylidene dichloride with anhydrous hydrogen fluoride, at least 50% of the fluorinated product obtained consists of monofluoride, the yield of difluoride being correspondingly reduced, and only traces of coke being formed.

In one form of the invention 1-fluoro-1-chloroethane is prepared by heating ethylidene dichloride with anhydrous hydrogen fluoride in the presence of stannic chloride. The amount of hydrogen fluoride used should be at least the stoichiometric equivalent of the ethylidene dichloride used, and it is preferable to use an excess of hydrogen fluoride. The amount of stannic chloride required is at least 2.5% by weight of the ethylidene dichloride used, and considerably larger proportions of the catalyst may be used with advantage. For example, good results are obtained when using amounts of stannic chloride ranging from 20% to 40% by weight of ethylidene dichloride. The reaction is suitably carried out in an autoclave constructed of a metal reasonably resistant to attack by the reactants, such as mild steel.

The process may be carried out under widely varied conditions of temperature and pressure. Superatmospheric pressure is preferably employed, suitable pressures being, for example, of the order of 100 to 200 lbs. per sq. in., although lower or higher pressures may be used if desired. Elevated temperatures are also preferable, for example temperatures within the range of 50° C. to 100° C. are suitable, although lower or higher temperatures may be used if desired.

The process may be carried out either batchwise or by a continuous method. In order to minimise the formation of the difluoro compound, such as 1,1-difluoro-ethane, which is produced by fluorination of ethylidene dichloride, it is desirable to remove the monofluoro compound from the reaction vessel continuously as it is formed. This is most conveniently effected by employing a continuous process, the hydrogen fluoride being fed continuously into the reaction vessel while the monofluoro compound is withdrawn. The proportion of monofluoride obtained by the continuous method is generally higher than that produced by a batch process.

The following examples illustrate but do not limit the invention all parts being by weight:

Example 1

495 parts of ethylidene dichloride, 200 parts of anhydrous hydrogen fluoride and 104 parts of anhydrous stannic chloride were charged into a mild steel autoclave. The mixture was heated to 70° C., a gauge pressure of 110 lbs/sq. in., being maintained. After one hour the evolution of hydrogen chloride had ceased, and the heating was therefore stopped, the pressure was released and the reaction mixture allowed to cool. Distillation of the product gave 40% yields, based on the ethylidene dichloride used, of each of 1-fluoro-1-chloroethane and 1,1-difluoroethane.

Example 2

In a continuous fluorination of ethylidene dichloride, 382 parts of ethylidene dichloride and 390 parts of anhydrous stannic chloride were charged into a mild steel autoclave and the mixture heated to 70° C. When the pressure reached 40 lbs./sq. in., 275 parts of anhydrous hydrogen fluoride at a constant rate of 126 parts per hour were passed in. The pressure of the reaction mixture was maintained constant by continuously taking off the fluorinated product.

A yield of 1-fluoro-1-chloroethane and 1,1- difluoroethane, based on ethylidene chloride consumed, of 43% and 20% respectively was obtained.

*Example 3*

In a continuous fluorination of ethylidene dichloride, 500 parts of ethylidene chloride and 400 parts of anhydrous stannic chloride were charged into a mild steel autoclave, and the mixture heated to 70° C. 250 parts of anhydrous hydrogen fluoride at a constant rate of 166 parts per hour were introduced and the pressure was maintained at 65 lbs./sq. in., by continuously withdrawing the product. A yield of 1-fluoro-1-chloroethane and 1, 1-difluoroethane, based on ethylidene chloride used, of 37.8% and 25.1% respectively was obtained.

*Example 4*

840 parts of asym-tetrachloroethane, 200 parts of anhydrous hydrogen fluoride and 208 parts of anhydrous stannic chloride were charged into a mild steel autoclave. The mixture was heated to 150° C. and a gauge pressure of 200 to 230 lbs./sq. in., was employed. After 3 hours the evolution of hydrogen chloride had ceased, the heating was stopped, the pressure released and the reaction mixture was allowed to cool. Distillation of the product gave a conversion of asym-tetrachloroethane to 1-fluoro-1,1,2-trichloroethane of 46% and to 1, 1-difluoro-1, 2-dichloroethane of 5%.

*Example 5*

668 parts of 1,1,2-trichloroethane, 120 parts of anhydrous hydrogen fluoride, and 180 parts of anhydrous stannic chloride were charged into a mild steel autoclave. The mixture was heated to 140° C. at a gauge pressure of approximately 280 lbs./sq. in. After three hours, the heating was stopped, the pressure released, and the reaction mixture allowed to cool. Distillation of the product gave a yield to 1-fluoro-1,2-dichloroethane of 33% based on 1,1,2-trichloroethane consumed. No coke or tarry byproduct was formed in the reaction.

I claim:

1. The process which comprises heating a polychlorinated ethane containing at least two chlorine atoms attached to the same carbon atom with from 1 to about 3.58 stoichiometric equivalents of anhydrous hydrogen fluoride in the presence of at least 2.5% by weight of stannic chloride based on the polychlorinated ethane at a temperature of from about 50° C. to about 150° C.

2. The process which comprises heating a polychlorinated ethane containing at least two chlorine atoms attached to the same carbon atom with from 1 to about 3.58 stoichiometric equivalents of anhydrous hydrogen fluoride in the presence of at least 2.5% by weight of stannic chloride based on the polychlorinated ethane at a temperature of from about 50° C. to about 150° C. and at elevated pressure.

3. The process which comprises heating a polychlorinated ethane containing at least two chlorine atoms attached to the same carbon atom with from 1 to about 3.58 stoichiometric equivalents of anhydrous hydrogen fluoride in the presence of from about 20% to about 102% by weight of stannic chloride based on the polychlorinated ethane at a temperature of from about 50° C. to about 150° C. and at elevated pressure.

4. The process which comprises continuously adding anhydrous hydrogen fluoride to a charge of a polychlorinated ethane, containing at least two chlorine atoms attached to the same carbon atom, and at least 2.5% by weight of stannic chloride based on the polychlorinated ethane until from 1 to about 3.58 stoichiometric equivalents of hydrogen fluoride have been added to the charge, said charge being maintained at a temperature of from about 50° C. to about 150° C. and at an elevated pressure, and continuously withdrawing a monofluorinated product from the charge.

5. The process which comprises continuously adding anhydrous hydrogen fluoride to a charge of a polychlorinated ethane, containing at least two chlorine atoms attached to the same carbon atom, and from about 20% to about 102% by weight of stannic chloride based on the polychlorinated ethane until from 1 to about 3.58 stoichiometric equivalents of hydrogen fluoride have been added to the charge, said charge being manitained at a temperature of from about 50° C. to about 150° C. and at elevated pressure, and continuously withdrawing a monofluorinated product from the charge.

6. The process for the production of 1-fluoro 1-chloro-ethane which comprises heating ethylidene dichloride with from 1 to about 3.58 stoichiometric equivalents of anhydrous hydrogen fluoride in the presence of at least 2.5% by weight of stannic chloride based on the ethylidene dichloride at a temperature of from about 50° C. to about 150° C. and at elevated pressure.

7. The process for the production of 1-fluoro 1-chloro-ethane which comprises heating ethylidene dichloride with from 1 to about 3.58 stoichiometric equivalents of anhydrous hydrogen fluoride in the presence of from about 20% to about 102% by weight of stannic chloride based on the ethylidene dichloride at a temperature of from about 50° C. to about 150° C. and at elevated pressure.

8. The process for the production of 1-fluoro-1,1,2-trichloroethane which comprises heating asym. tetrachloroethane with from 1 to about 3.58 stoichiometric equivalents of anhydrous hydrogen fluoride in the presence of at least 2.5% by weight of stannic chloride based on the asym. tetrachloroethane at a temperature of from about 50° C. to about 150° C. and at elevated pressure.

9. The process for the production of 1-fluoro-1,2-dichloroethane which comprises heating 1,1,2-trichloroethane with from 1 to about 3.58 stoichiometric equivalents of anhydrous hydrogen fluoride in the presence of at least 2.5% by weight of stannic chloride based on the 1,1,2-trichloroethane at a temperature of from about 50° C. to about 150° C. at elevated pressure.

WILLIAM BASIL WHALLEY.

REFERENCES CITED

The following references are of record in the file of this patent:

UNITED STATES PATENTS

| Number | Name | Date |
|---|---|---|
| 2,005,710 | Daudt et al. | June 18, 1935 |

FOREIGN PATENTS

| Number | Country | Date |
|---|---|---|
| 670,130 | Germany | Jan. 12, 1939 |

OTHER REFERENCES

Henne et al., Jour. Am. Chem. Soc., vol. 58, 404–6 (1936).